(12) United States Patent
Gulo et al.

(10) Patent No.: US 10,670,728 B2
(45) Date of Patent: *Jun. 2, 2020

(54) METHOD AND SYSTEM FOR CROWD-SOURCED TRUSTED-GPS REGION FOR MOBILE DEVICE LOCALIZATION

(71) Applicant: MAPSTED CORP., Mississauga (CA)

(72) Inventors: Eros Gulo, Woodbridge (CA); Sean Huberman, Guelph (CA)

(73) Assignee: MAPSTED CORP., Mississauga, Ontario (CA)

(*) Notice: Subject to any disclaimer, the term of this patent is extended or adjusted under 35 U.S.C. 154(b) by 0 days.

This patent is subject to a terminal disclaimer.

(21) Appl. No.: 16/180,306

(22) Filed: Nov. 5, 2018

(65) Prior Publication Data

US 2020/0142076 A1    May 7, 2020

(51) Int. Cl.
| | | |
|---|---|---|
| H04W 24/00 | (2009.01) | |
| G01S 19/08 | (2010.01) | |
| G01C 21/20 | (2006.01) | |
| H04W 4/024 | (2018.01) | |
| H04W 64/00 | (2009.01) | |
| H04W 4/80 | (2018.01) | |

(52) U.S. Cl.
CPC ............ *G01S 19/08* (2013.01); *G01C 21/206* (2013.01); *H04W 4/024* (2018.02); *H04W 64/003* (2013.01); *H04W 4/80* (2018.02)

(58) Field of Classification Search
CPC ........... H04W 4/02; H04W 4/14; H04W 4/22; H04W 48/04; H04W 64/00; H04L 29/08108

USPC ..... 455/404.2, 414.1, 456.1–456.6, 457, 466
See application file for complete search history.

(56) References Cited

U.S. PATENT DOCUMENTS

| | | | |
|---|---|---|---|
| 2009/0043504 A1 | 2/2009 | Bandyopadhyay et al. | |
| 2009/0303005 A1* | 12/2009 | Tuttle | H04Q 9/00 340/10.1 |
| 2014/0003680 A1* | 1/2014 | Marciniak | G06K 9/00006 382/124 |
| 2015/0081583 A1* | 3/2015 | Butler | G06Q 10/0833 705/333 |
| 2015/0312722 A1* | 10/2015 | Mori | H04W 4/029 455/456.3 |
| 2016/0379074 A1 | 12/2016 | Nielsen et al. | |
| 2017/0041806 A1* | 2/2017 | Randall | H04W 16/18 |
| 2017/0126834 A1* | 5/2017 | Fransen | H04L 67/303 |
| 2019/0179031 A1* | 6/2019 | Broumandan | G01S 19/215 |

* cited by examiner

*Primary Examiner* — Matthew W Genack

(57) ABSTRACT

A method and system for deploying a trusted-global positioning system (trusted-GPS) positioning map. The method comprises receiving, at a memory of the server computing device, at least a first set of fingerprint data and at least a first set of GPS position data for a sequence of positions traversed within an indoor area by at least a first mobile device, generating, using the processor, a distribution of positioning data points of the indoor area for which a correlation between the at least a first set of fingerprint data and the at least a first set of GPS position data for respective ones of the sequence of positions exceeds a threshold correlation value, and when the distribution exceeds at least one of a predetermined and a dynamically updated threshold density of positioning data points, deploying the distribution as the trusted-GPS positioning map of the indoor area.

16 Claims, 5 Drawing Sheets

METHOD AND SYSTEM FOR CROWD-SOURCED TRUSTED-GPS REGION FOR MOBILE DEVICE LOCALIZATION

TECHNICAL FIELD

The disclosure herein relates to the field of mobile device navigation and positioning.

BACKGROUND

Users of mobile devices are increasingly using and depending upon indoor positioning and navigation applications and features. Seamless, accurate and dependable indoor positioning can be difficult to achieve using satellite-based navigation systems when the latter becomes unavailable or sporadically available, such as within enclosed or partly enclosed urban infrastructure and buildings, including hospitals, shopping malls, airports, universities and industrial warehouses. To address this problem, indoor navigation solutions increasingly rely on sensors including accelerometers, gyroscopes, and magnetometers which may be commonly included in mobile phones and other mobile devices. Wireless communication signal data, ambient barometric data, mobile device inertial data and magnetic field data may be measured applied in localizing a mobile device along a route traversed within indoor infrastructure.

DETAILED DESCRIPTION

Figure 1:
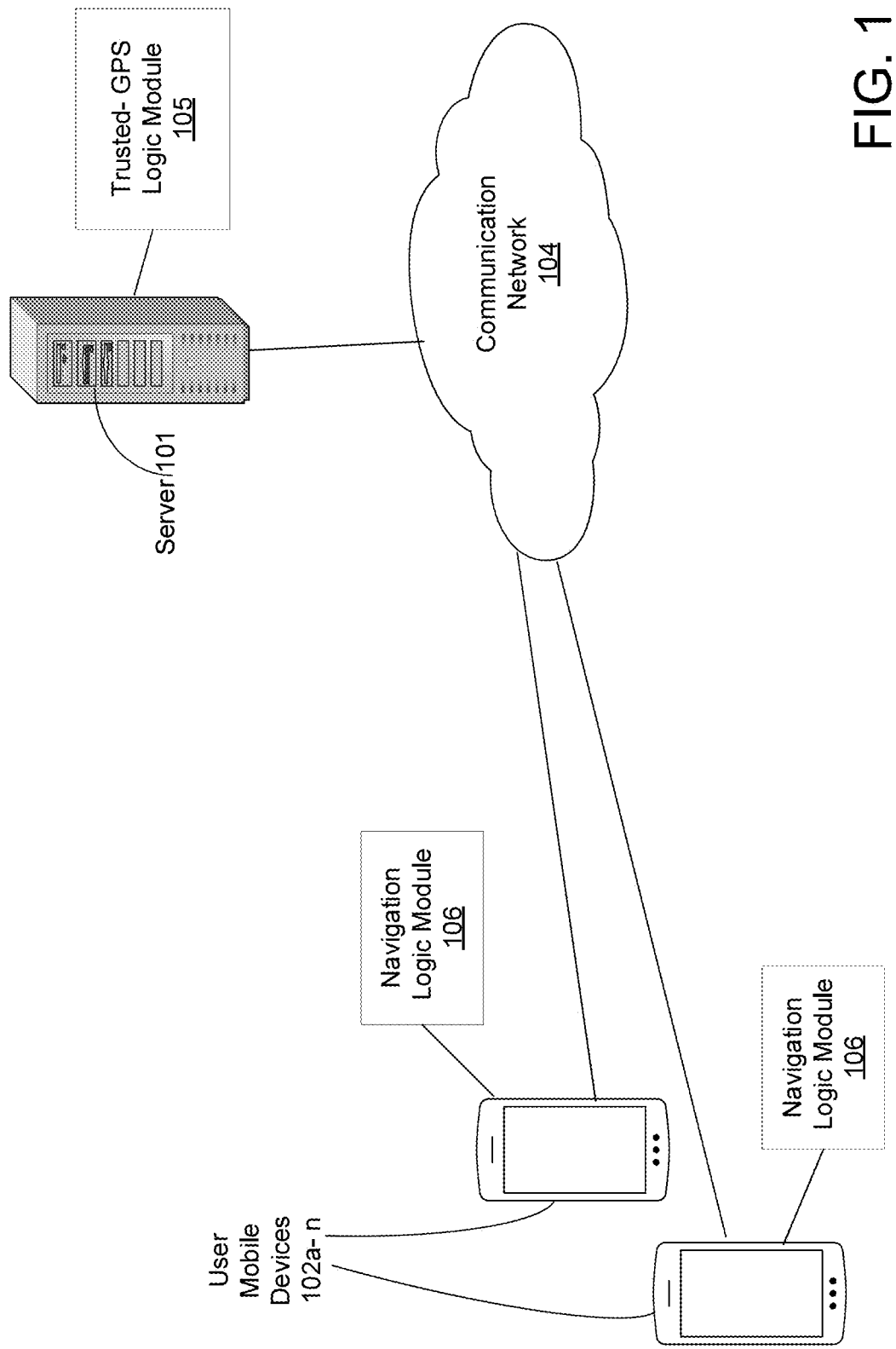
FIG. 1 illustrates, in an example embodiment, a system for generating and deploying a trusted-GPS region of an indoor area.

Embodiments herein recognize that mobile devices used for indoor navigation must perform with a degree of responsiveness that meets or exceeds user expectations. Among other technical effects and advantages, embodiments herein provide solutions which are directed to using indoor navigation solutions in a manner that enhances responsiveness and timeliness while preserving mobile device resources-usage, such as processor and memory resources, in a most economical manner to preserve longevity of mobile device power in a charged state. Embodiments herein also recognize that, among the various data inputs to user indoor navigation such as wireless signal data, inertial data, magnetic data, barometric and other data, wireless signal data processing consumes predominantly more than the other data input processing, typically by a significant margin. Also, depending on the quality and performance of the particular wireless infrastructure deployed in a building or indoor facility, a lower quality infrastructure may lead to delays in wireless signal processing at the mobile device, and thus delays in localizing the mobile device, to the dissatisfaction of a mobile device user. The latter adverse effect may become even more pronounced in situations where the mobile device is an older type, having a slower processor and a lower amount of random access memory relative to newer mobile devices.

Provided is a method of deploying a trusted-global positioning system (trusted-GPS) positioning map. The method comprises receiving, at a memory of the server computing device, at least a first set of fingerprint data and at least a first set of GPS position data for a sequence of positions traversed within an indoor area by at least a first mobile device, generating, using the processor, a distribution of positioning data points of the indoor area for which a correlation between the at least a first set of fingerprint data and the at least a first set of GPS position data for respective ones of the sequence of positions exceeds a threshold correlation value, and when the distribution exceeds at least one of a predetermined and a dynamically updated threshold density of positioning data points, deploying the distribution as the trusted-GPS positioning map of the indoor area.

Also provided is a server computing system for deploying a trusted-global positioning system (trusted-GPS) positioning map. The server system comprises a processor, and a memory storing a set of instructions. The instructions are executable in the processor to receive, at a memory of the server computing device, at least a first set of fingerprint data and at least a first set of GPS position data for a sequence of positions traversed within an indoor area by at least a first mobile device, generate, using the processor, a distribution of positioning data points of the indoor area for which a correlation between the at least a first set of fingerprint data and the at least a first set of GPS position data for respective ones of the sequence of positions exceeds a threshold correlation value, and when the distribution exceeds at least one of a predetermined and a dynamically updated threshold density of positioning data points, deploy the distribution as the trusted-GPS positioning map of the indoor area.

While GPS and cellular signals are typically inaccurate or unreliable indoors, often times there may be pockets where it can be more trustworthy, for example, near a skylight or near large windows. The disclosure herein proposes a system and method for automatically identifying these trustworthy areas via crowdsourced mobile device user data. The disclosure herein provide for knowledge of these areas to be applied for indoor positioning purposes or for license to other parties as regions in which GPS-based geofences can be viable, such as for commercial promotions purposes.

The disclosure herein provide for discovery of favorable areas where GPS positioning be relied upon as a light, cost-effective alternative to data fusion techniques for indoor positioning purposes, such as where full indoor or infrastructure coverage using wireless signals and magnetic field measurements might not be available or reliable, and also to establish a light-weight cost-effective geofence.

Such defined or designated GPS regions can be used as geofences for commercial promotions purposes, since identification as a GPS-trusted region where the geofence is accurate and can be confidently determined via GPS and cellular data alone, without the need of any additional data fusion processing applied for indoor navigation or positioning. Yet further, the GPS-trusted region positioning data may be applied with a commensurably higher weighting when localizing, in conjunction with some subset of data fusion based on fingerprint input parameters, within the GPS-trusted region geofence, at least to minimize mobile device processor and memory resources usage, with consequent mobile device responsiveness as experience by the carrying user within the indoor area.

The term fingerprint, variously referred to herein as fingerprint data, in one embodiment constitutes time-stamped, time-correlated, individual measurements of any combination of received wireless communication signal strength information, magnetic field information (strength, direction) or barometric pressure information at known, fixed locations within an area, including an indoor area. In other words, a fingerprint includes a correlation of sensor and signal information (including, but not necessarily limited to wireless signal strength, magnetic or barometric information inertial sensor information) at a given instance in time, at a unique position along a sequence of positions that constitute a navigation path traversed by the mobile device. Additionally, given that sampling times and sampling rates applied to particular device sensors may be different, the signal and sensor information as measured may be time-averaged across particular periods of time, with the time-averaged value being used to represent the signal information at any given instance of time within that particular period of time in which the signal information is time-averaged.

In a crowd sourcing-based approach, users may be provided an indoor positioning mobile device application and may be encouraged to walk around the area of interest, such as an indoor shopping mall. At various known, fixed locations within the area, events, also referred to herein as occurrence events, may be triggered and logged. Based on the logged data, an offline estimation of the user trajectory may be determined, and corresponding to known fixed locations, fingerprint measurements may be correlated with respective indoor locations along a trajectory, or trajectory segments, along which a user's mobile device traverses while within the area. As more trajectories from numerous other users are accumulated and logged, the averaging of user results may be used to accomplish a fingerprint mapping of the area or region.

In particular, the crowd sourcing based embodiments described here advantageously avoid the need for tedious and expensive specially-purposed, dedicated mapping of trusted-GPS regions of an indoor area, and result in a more accurate map representation of a targeted environment. Users incentives, for example, may be offered, to encourage random mobile device users to participate using their mobile device indoor navigation application.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some embodiments described herein can generally require the use of computing devices, including processor and memory resources. For example, one or more embodiments described herein may be implemented, in whole or in part, on computing devices such as servers, desktop computers, mobile devices including cellular or smartphones, laptop computers, wearable devices, and tablet devices. Memory, processing, and network resources may all be used in connection with the establishment, use, or performance of any embodiment described herein, including with the performance of any method or with the implementation of any system.

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable memory storage units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, embodiments may be implemented in the form of computer-programs, or a computer usable carrier medium capable of carrying such a program.

System Description

FIG. 1 illustrates, in an example embodiment, a system for generating and deploying a trusted-GPS map feature of an indoor area. Server 101, includes trusted-GPS logic module 105, and is communicatively connected via communication network 104 to a plurality of computing and communication mobile devices 102a-n, also referred to herein as mobile device(s) 102a-n. Mobile devices 102a-n include navigation logic module 106, which in one embodiment, may be included in an indoor positioning, or indoor navigation, software application downloaded and installed at individual ones of mobile devices 102a-n.

Figure 2:
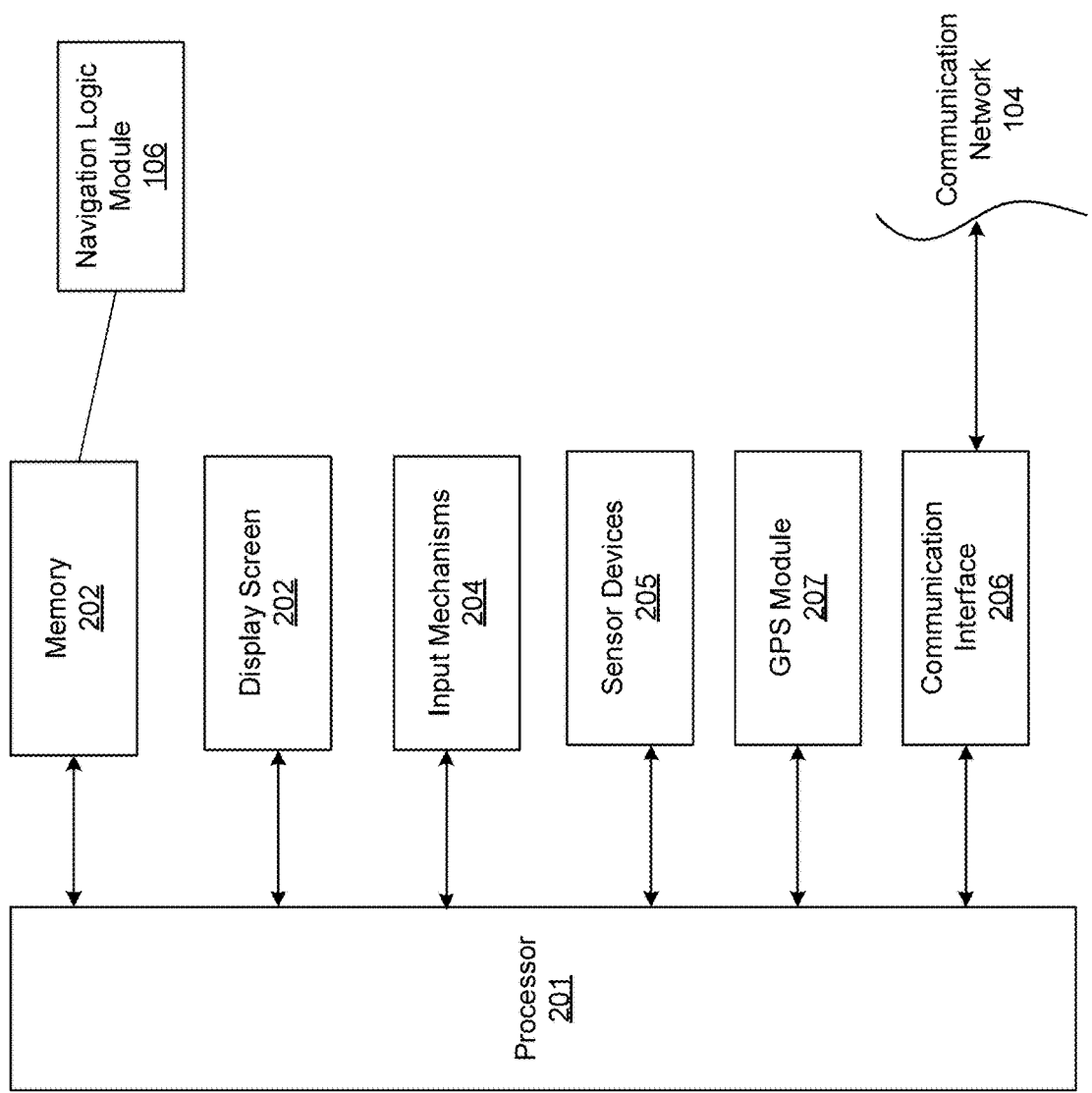
FIG. 2 illustrates an example architecture of a computing and communication mobile device for acquisition of localized positioning data.

FIG. 2 illustrates an example architecture of a computing and communication mobile device 102, representative of a plurality of mobile devices 102a-n for acquisition of fingerprint data in conjunction with GPS data for particular positions or locations within the indoor area. As used herein, the term mobile device 102 refers to any singular mobile device among mobile devices 102a-n. In one embodiment, mobile device 102 may correspond to, for example, a cellular communication device (e.g., smartphone, tablet, etc.) that is capable of telephony, messaging, and/or data computing services. In variations, mobile device 102 can correspond to, for example, a tablet or a wearable computing device. Mobile device 102 may include processor 201, memory 202, display screen 203, input mechanisms 204 such as a keyboard or software-implemented touchscreen input functionality, barcode, QR code or other symbol- or code-scanner input functionality. Mobile device 102 may include global positioning system (GPS) module 207, with the GPS and cellular data acquired capable of providing particular locations of mobile device 102. Mobile device 102 may include sensor functionality by way of sensor devices 205. Sensor devices 205 may include any of inertial sensors (accelerometer, gyroscope), magnetometer or other magnetic field sensing functionality, and barometric or other environmental pressure sensing functionality. Mobile device 102 may also include capability for detecting and communicatively accessing wireless communication signals, including but not limited to any of Bluetooth, Wi-Fi, RFID, and GPS signals. Mobile device 102 further includes the capability for detecting and measuring a received signal strength of the wireless communication signals. In particular, mobile device 102 may include location determination capability such as by way of GPS module 205, and communication interface 206 for communicatively coupling to communication network 104, such as by sending and receiving cellular data over data channels and voice channels.

Navigation logic module 106 includes instructions stored in memory 202 of mobile device 102. In embodiments, navigation logic module 106 may be included in a mobile device navigation application program stored in memory 202 of mobile device 102 for acquiring fingerprint data within an area by any of plurality of mobile devices 102a-n. The area may be an indoor area within a shopping mall, an airport, a warehouse, a university, or any at least partially enclosed building. Acquisition of the fingerprint data may be automatically triggered at respective ones of mobile devices 102a-n upon an event occurrence. The event occurrence may consist of a user of mobile device 102 redeeming a promotion coupon at a merchant within a shopping mall, scanning a barcode, using an RFID tag, or upon the mobile device 102 becoming present at specific predetermined locations within the area. The occurrence event may be also based on detecting a proximity beacon wireless signal, in some examples. Acquisition of the fingerprint data by a user's mobile device 102 may thus be automatically triggered upon the event occurrence at any one of a predetermined set of fixed positions within the area.

In this manner, a user of mobile device 102 may, in effect, passively assist in creating a trusted-GPS region by acquiring fingerprint data, then allowing uploading or other transfer of the acquired fingerprint data to server 101 for further processing. The fingerprint data may be acquired at least in part using sensor devices 205 of the mobile devices, including but not limited to an accelerometer, a gyroscope, a magnetometer, a barometer, and a wireless signal strength sensor. The fingerprint data may include any one of orientation data, a magnetic field data including strength and direction, received wireless signal strength data, barometric pressure data, and also GPS location data at a position within the area for respective mobile devices.

As the fingerprint data acquired at mobile device 102 is time-stamped and the data collection via navigation logic module 106 operates in a distributed manner, the fingerprint data may be cached on the local memory 202 and subsequently batch transferred as a compressed data file for post-processing at server 101, in some embodiments. Navigation logic module 106, in effect, operates to pre-process fingerprint data and extract key features which can assist in the mobile device 102 trajectory reconstruction during the post processing step at server 101. The pre-processing step at navigation logic module 106 may include counting the number of steps taken by a user of mobile device 102, estimating the step length of each step, estimating the heading direction for each step, as well as, recording the time-averaged and time-stamped magnetic field information and wireless radio signals, and monitoring for, and logging, occurrence of any triggered event/tag-based data that enables the trajectory of mobile device 102 to be best matched a physical map of the area that includes known fixed objects at unique locations.

Figure 3:
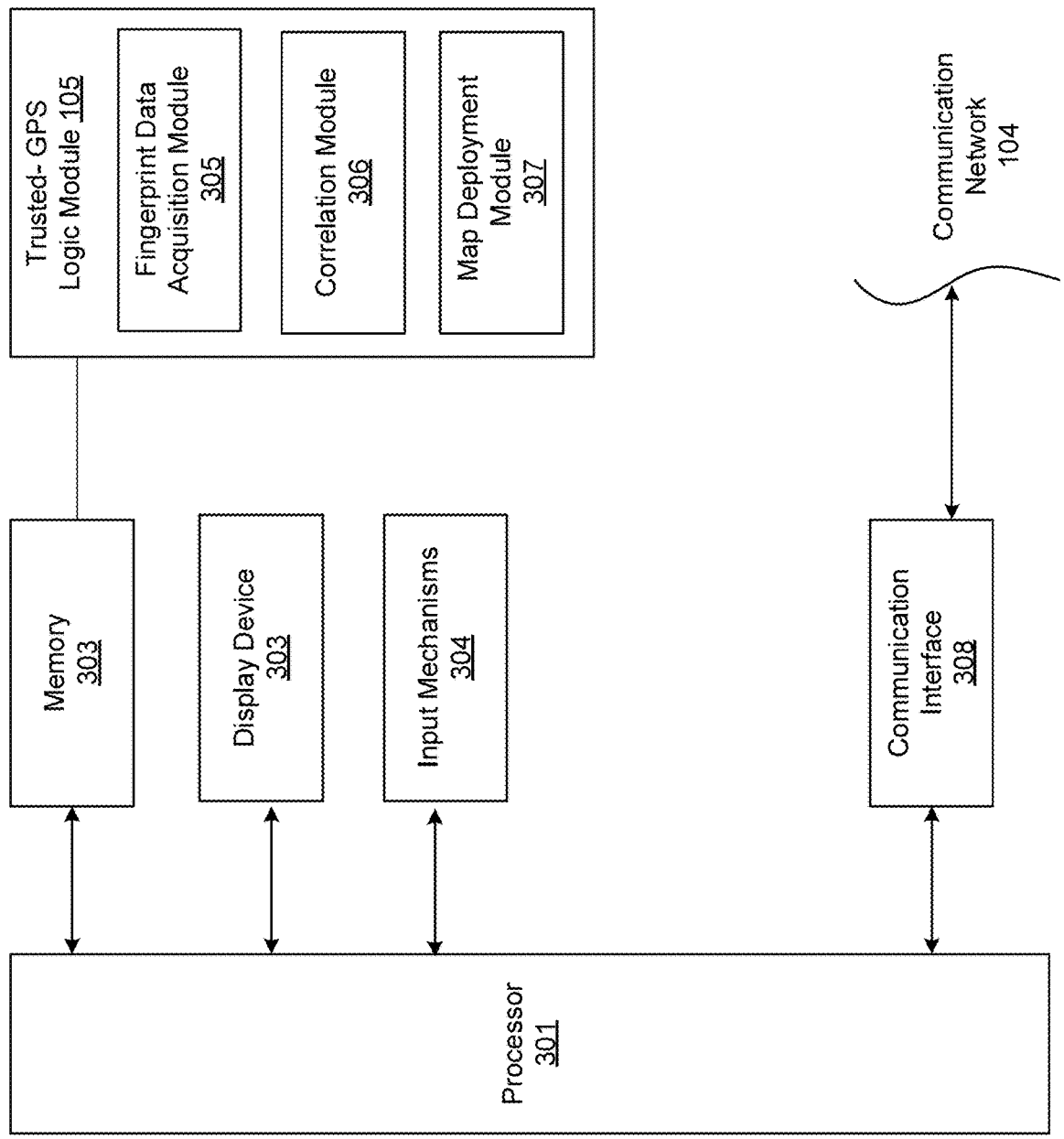
FIG. 3 illustrates an example architecture of a server computing device for generating and deploying a trusted-GPS region of an indoor area.

FIG. 3 illustrates an example architecture of a server computing device for generating and deploying a trusted-GPS map feature. Server 101, in an embodiment architecture, may be implemented on one or more server devices, and includes processor 301, memory 302 which may include a read-only memory (ROM) as well as a random access memory (RAM) or other dynamic storage device, display device 303, input mechanisms 304 and communication interface 305 for communicative coupling to communication network 104. Processor 301 is configured with software and/or other logic (such as from trusted-GPS logic module 105) to perform one or more processes, steps and other functions described with implementations, such as described by FIGS. 1 through 4 herein. Processor 301 may process information and instructions stored in memory 302, such as provided by a random access memory (RAM) or other dynamic storage device, for storing information and instructions which are executable by processor 301. Memory 302 also may be used for storing temporary variables or other intermediate information during execution of instructions to be executed by processor 301. Memory 302 may also include the ROM or other static storage device for storing static information and instructions for processor 301; a storage device, such as a magnetic disk or optical disk, may be provided for storing information and instructions. Communication interface 305 enables server 101 to communicate with one or more communication networks 104 (e.g., cellular network) through use of the network link (wireless or wired). Using the network link, server 101 can communicate with computing devices 102a-n.

Trusted-GPS logic module 105 of server 101 may include instructions stored in RAM of memory 302, and includes fingerprint data acquisition module 305, correlation module 306, and map deployment module 307.

Processor 301 uses executable instructions stored in fingerprint data acquisition module 305 to acquire fingerprint data within the area by a plurality of mobile devices 102a-n. The area may be an indoor area within a shopping mall, an airport, a warehouse, a university, or any at least partially enclosed building. In embodiments, the fingerprint data, as acquired from mobile devices 102a-n, further includes respective time-stamps, whereby the orientation, the magnetic field strength and direction, the received wireless signal strength, the barometric pressure, and the position data can be time-correlated for any given position along a trajectory or trajectory segment of the mobile devices, in accordance with the respective time-stamps. Additionally, when the sampling times and sampling rates applied to particular ones of device sensors 205 are different, the signal and sensor information as measured may be time-averaged across particular periods of time, with the time-averaged value being used to represent the signal information at any given instance of time within that particular period of time in which the signal information is time-averaged.

Processor 301 uses executable instructions stored in correlation module 306 to generate a distribution of positioning data points of the indoor area for which a correlation between the at least a first set of fingerprint data and the at least a first set of GPS position data for respective ones of the sequence of positions exceeds a threshold correlation value. The term "position" as used herein refers to a coordinate location, and may be expressed in local or global (X, Y) coordinate terms. In some embodiments, the coordinates may further include a Z coordinate representing a height, for example associated with a given floor within a multi-floor building, and thus expressed in (X, Y, Z) coordinate terms. Further processing, via the instructions constituting correlation module 306 executable in processor 301, may apply for a second set of fingerprint data and the calibrated data points to generate an updated distribution of calibrated data points.

Processor 301 uses executable instructions stored in map deployment module 307 when the distribution exceeds at least one of a predetermined and a dynamically updated threshold density of positioning data points, deploying the distribution as the trusted-GPS positioning map of the indoor area. A density determination algorithm may be applied, in one embodiment, to establish the predetermined threshold density based on validating the distribution of data points as sufficient for deployment, representing the trusted-GPS positioning map of the area. In another embodiment, the threshold density for deployment may be dynamically determined, and dynamically updated, based on updating at least one of the density of calibration data points and the consistency amongst the calibration data points relative to a neighboring area contiguous with the target area. Dynamically updating the threshold density in the latter manner allows the system to automatically detect and correct potential calibration inconsistencies prior to deploying the calibrated positioning map of the area. The density determination algorithm may be employed in conjunction with an artificial neural network to validate when a sufficient number of fingerprint and GPS positioning data points have been collected and accumulated for specific areas or regions within the areas. In particular, this process can also assist in identifying pedestrian traffic patterns and traffic densities for particular areas and times within the area or the shopping mall, as well as to provide the capability to assess whether or not a sufficient amount of data has been collected to complete the trusted-GPS region map deployment process. In the present embodiment, the one-time artificial neural network processing initializes the fingerprint data. Moreover, based on the artificial neural network processing, a dynamic incremental fingerprint updating scheme may be employed to dynamically maintain up-to-date fingerprint calibration data sets.

Methodology

Figure 4:
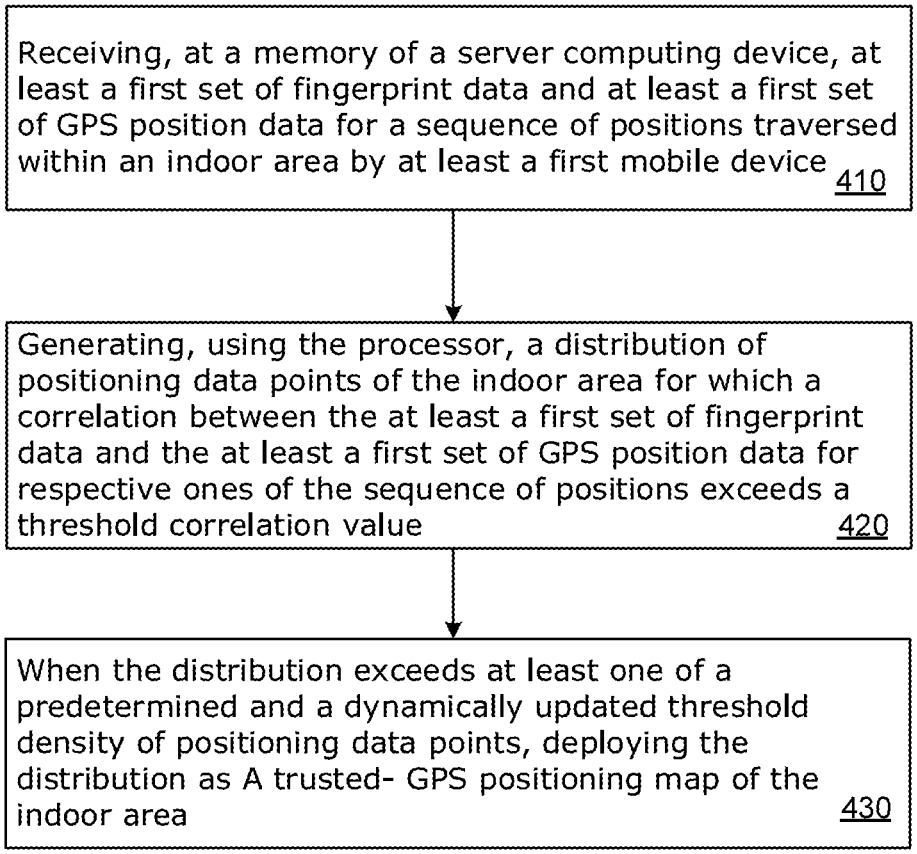
FIG. 4 illustrates, in an example embodiment, a method of operation in deploying a trusted-GPS region.

FIG. 4 illustrates, in an example embodiment, a method of operation 400 in deploying a trusted-GPS map feature. In describing examples of FIG. 4, reference is made to the examples of FIGS. 1-3 for purposes of illustrating suitable components or elements for performing a step or sub-step being described.

Examples of method steps described herein are related to the use of server 101 for implementing the techniques described herein. According to one embodiment, the techniques are performed by trusted-GPS logic module 105 of server 101 in response to the processor 301 executing one or more sequences of software logic instructions that constitute trusted-GPS logic module 105. In embodiments, trusted-GPS logic module 105 may include the one or more sequences of instructions within sub-modules including fingerprint data acquisition module 305, correlation module 306 and map deployment module 307. Such instructions may be read into memory 302 from machine-readable medium, such as memory storage devices. Execution of the sequences of instructions contained in fingerprint data acquisition module 305, correlation module 306 and map deployment module 307 of trusted-GPS logic module 105 in memory 302 causes processor 301 to perform the process steps described herein. In alternative implementations, at least some hard-wired circuitry may be used in place of, or in combination with, the software logic instructions to implement examples described herein. Thus, the examples described herein are not limited to any particular combination of hardware circuitry and software instructions.

At step 410, receiving, at memory 302 of server computing device 101, at least a first set of fingerprint data and at least a first set of GPS position data for a sequence of positions traversed within an indoor area by at least a first mobile device 101*a-n*. The area may be an indoor area within a shopping mall, an airport, a warehouse, a university, or any at least partially enclosed building. Acquisition of the first and second sets of fingerprint data may be automatically triggered at respective mobile devices upon an event occurrence. The event occurrence may consist of a user redeeming a coupon at a merchant within a shopping mall, scanning a barcode, using an RFID tag, or may be based on accessibility of a proximity beacon wireless signal, in some examples. Acquisition of the fingerprint data by a user's mobile device may thus be automatically triggered upon the event occurrence at any one of a predetermined set of fixed positions within the area. In this manner, a user of mobile device 102 may, in effect, passively assist in the positioning data points calibration process by acquiring fingerprint data, then allowing uploading or other transfer of the acquired fingerprint data to server 101 for further processing. The fingerprint data may be acquired using sensor devices 205 of the mobile devices, including but not limited to an accelerometer, a gyroscope, a magnetometer, a barometer, and a wireless signal strength sensor, in conjunction with GPS positioning data using GPS module 107. The fingerprint data may include any one of an orientation, a magnetic field strength and direction, a received wireless signal strength, a barometric pressure, and an optical line of sight data at a position within the area for respective mobile devices.

In embodiments, the fingerprint data, as acquired from the mobile devices, further includes respective time-stamps, whereby the orientation and other inertial sensor data, the magnetic field strength and direction, the received wireless signal strength, the barometric pressure, and the position data can be time-correlated in accordance with the time-stamps with respect to any given position along a sequence of positions describing a trajectory or trajectory segment of the mobile devices 101*a-n*. Additionally, given that sampling times and sampling rates applied to particular ones of device sensors 205 may be different, the signal and sensor information as measured may be time-averaged across particular periods of time, with the time-averaged value being used to represent the signal information at any given instance of time within that particular period of time in which the signal information is time-averaged.

At step 420, generating, using the processor, a distribution of positioning data points of the indoor area for which a correlation between the at least a first set of fingerprint data and the at least a first set of GPS position data for respective ones of the sequence of positions exceeds a threshold correlation value. The terms position or positioning as used herein refers to a coordinate location and may be expressed in local or global (X, Y, Z) coordinate terms.

At step 430, using the executable instructions of map deployment module 305, when the distribution exceeds at least one of a predetermined and a dynamically updated threshold density of positioning data points for deploying the distribution as the trusted-GPS positioning map of the indoor area. In one embodiment, the threshold density for deployment may be dynamically determined, and dynamically updated. Dynamically updating the threshold density allows the system to automatically detect and correct potential calibration inconsistencies prior to deploying the trusted-GPS map of the area. A density determination algorithm may be applied, in one embodiment, to establish the predetermined threshold density based on validating the distribution of data points as sufficient for deployment.

In some embodiments, the indoor area may include one of a shopping mall, an airport, a warehouse, a campus building and an at least partially enclosed building.

The acquisition of the first and second sets of fingerprint data may be automatically triggered at the at least one mobile device upon an event occurrence, the event occurrence comprising at least one of redeeming a coupon, scanning a barcode, and using an RFID tag.

The fingerprint data may include at least two of wireless signal data, inertial data, magnetic data, barometric data and optical data that are time-stamped and time-correlated for respective positions in the sequence of positions.

The threshold correlation value may be a predetermined value, in one embodiment, a threshold correlation of at least 85% between respective coordinate positions as determined via the GPS module of the mobile device and the mobile device localization based on the data fusion.

A density determination algorithm may be applied to establish a predetermined threshold density as sufficient for deploying as the trusted-GPS positioning map of the indoor area.

The threshold density of positioning data points may be dynamically updated in conjunction with an artificial neural network to validate when a sufficient number of positioning data points have been accumulated for at least a portion of the indoor area.

In one embodiment, an outer boundary described by the distribution of positioning data points may be defined as a trusted-GPS boundary. The outer boundary may circumscribe an enclosed region within the indoor area, in another variation. In yet another embodiment, the enclosed region may be designated as a trusted-GPS region.

Figure 5:
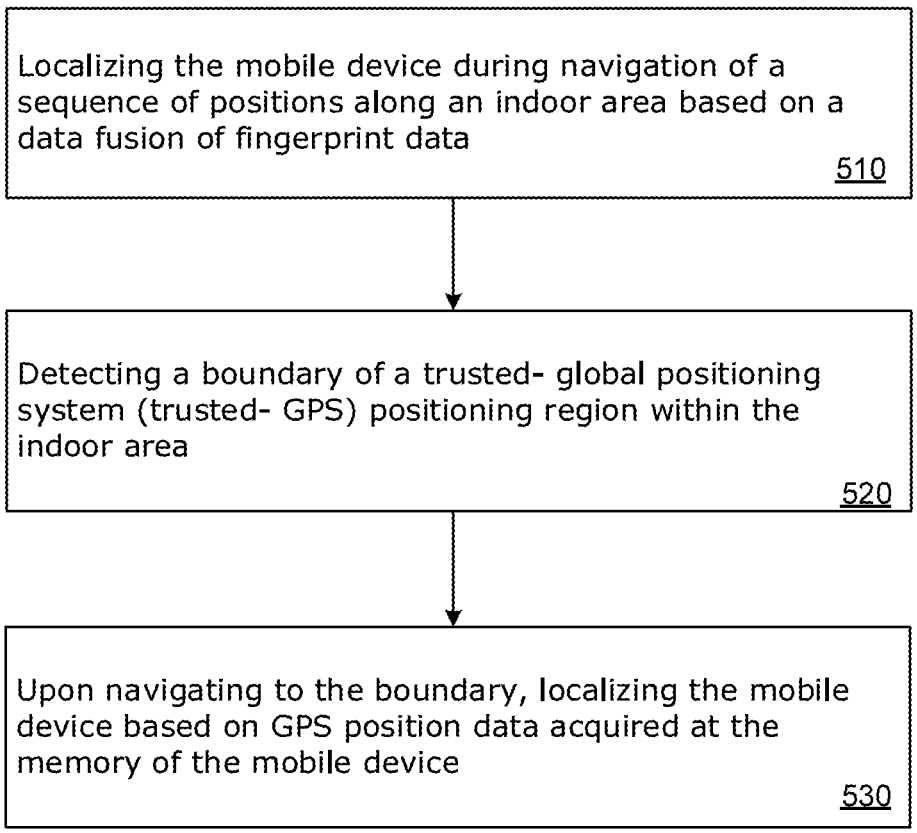
FIG. 5 illustrates, in an example embodiment, a method of utilizing a trusted-GPS region in localizing a mobile device.

FIG. 5 illustrates, in an example embodiment, a method 500 of utilizing a trusted-GPS region for localizing mobile device 102. In describing examples of FIG. 5, reference is made to the examples of FIGS. 1-4 for purposes of illustrating suitable components or elements for performing a step or sub-step being described.

Examples of method steps described herein are related to localization of mobile device 102 using the techniques described herein. According to one embodiment, the techniques are performed by navigation logic module 106 of mobile device 102 in response to the processor 201 executing one or more sequences of software logic instructions that constitute navigation logic module 106. In embodiments, navigation logic module 106 may be incorporated into an indoor navigation application downloaded into memory 202 of mobile device 102, and executable in processor 201 of mobile device 102.

At step 510, using the processor 201, localizing the mobile device 102 during navigation of a sequence of positions along an indoor area based on a data fusion of fingerprint data.

At step 520, detecting, using the processor 201, a boundary of a trusted-global positioning system (trusted-GPS) positioning region within the indoor area.

At step 530, upon navigating to the boundary, localizing the mobile device 102 based on GPS position data acquired at the memory of the mobile device.

In one aspect, the data fusion is based on fingerprint data that includes at least two of wireless signal data, inertial data, magnetic data, barometric data and optical data, the fingerprint data being time-stamped and time-correlated for respective positions in the sequence of positions.

In embodiments, the fingerprint data is acquired using a set of sensors of the mobile device, the sensors including at least one of an accelerometer, a gyroscope, a magnetometer, a barometer, and a wireless signal strength sensor.

The fingerprint data may include at least one of an orientation, a magnetic field strength and direction, a received wireless signal strength, and a barometric pressure. The GPS position data may be acquired using a GPS module of the mobile device.

In an embodiment, upon navigating to the boundary, the data fusion input parameters may be modified to exclude at least one of wireless signal data, magnetic data, and inertial data, or at least to exclude the processing thereof. The modifying may, alternately or additionally, be based on switching off at least one sensor of the mobile device. The modifying may further be based on terminating processing of fingerprint databased on at least one wireless signal sensor of the mobile device, in one aspect.

The boundary may encompass the trusted-GPS positioning region, and the method may further comprise maintaining the modified state while navigating within the trusted-GPS positioning region of the indoor area.

It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mention of the particular feature. Thus, the absence of describing combinations should not preclude the inventor from claiming rights to such combinations.

What is claimed is:

1. A method for deploying a trusted-global positioning system (trusted-GPS) positioning map, the method executed in a processor of a server computing device and comprising:

receiving, at a memory of the server computing device, at least a first set of fingerprint data and at least a first set of GPS position data for a sequence of positions traversed within an indoor area by at least a first mobile device;

generating, using the processor, a distribution of positioning data points of the indoor area for which a correlation value between the at least a first set of fingerprint data and the at least a first set of GPS position data for respective ones of the sequence of positions exceeds a threshold correlation value, the correlation value defining an extent of correlation between the sequence of positions determined using the at least first set of GPS position data and the sequence of positions determined using data fusion of the at least a first set of fingerprint data; and when the distribution exceeds at least one of a predetermined and a dynamically updated threshold density of positioning data points, deploying the distribution as the trusted-GPS positioning map of the indoor area, the trusted-GPS positioning map including an outer boundary described by the distribution of positioning data points as a trusted-GPS boundary for geofencing, the outer boundary describing an enclosed region within the indoor area, wherein localization of a user device inside the trusted-GPS boundary is performed using GPS position data and a subset of fingerprint data pertaining to the user device, the GPS position data being assigned higher weighting than the subset of the fingerprint data while the localizing is occurring, and wherein the subset of the fingerprint data includes at least one of wireless signal data, inertial data, magnetic data, barometric data and optical data.

2. The method of claim 1 wherein the indoor area comprises one of a shopping mall, an airport, a warehouse, a campus building and an at least partially enclosed building.

3. The method of claim 1 wherein acquisition of the at least a first set of fingerprint data is automatically triggered at the at least one mobile device upon an event occurrence, the event occurrence comprising at least one of redeeming a coupon, scanning a barcode, and using an RFID tag.

4. The method of claim 1 wherein the fingerprint data includes at least two of the wireless signal data, the inertial data, the magnetic data, the barometric data and the optical data that are time-stamped and time-correlated for respective positions in the sequence of positions.

5. The method of claim 1 wherein the threshold correlation value comprises a threshold correlation of at least 85%.

6. The method of claim 1 wherein a density determination algorithm establishes the predetermined threshold density as sufficient for deploying as the trusted-GPS positioning map of the indoor area.

7. The method of claim 1 wherein the threshold density of positioning data points is dynamically updated in conjunction with an artificial neural network to validate when a sufficient number of positioning data points have been accumulated for at least a portion of the indoor area.

8. The method of claim 1 further comprising defining the enclosed region as a trusted-GPS region.

9. A server computing system for deploying a trusted-global positioning system (trusted-GPS) positioning map, the server system comprising:
   a processor; and
   a memory storing a set of instructions, the instructions executable in the processor to:
   receive, at a memory of the server computing device, at least a first set of fingerprint data and at least a first set of GPS position data for a sequence of positions traversed within an indoor area by at least a first mobile device;
   generate, using the processor, a distribution of positioning data points of the indoor area for which a correlation value between the at least a first set of fingerprint data and the at least a first set of GPS position data for respective ones of the sequence of positions exceeds a threshold correlation value, the correlation value defining an extent of correlation between the sequence of positions determined using the at least first set of GPS position data and the sequence of positions determined using data fusion of the at least a first set of fingerprint data; and
   when the distribution exceeds at least one of a predetermined and a dynamically updated threshold density of positioning data points, deploy the distribution as the trusted-GPS positioning map of the indoor area, the trusted-GPS positioning map including an outer boundary described by the distribution of positioning data points as a trusted-GPS boundary for geofencing, the outer boundary describing an enclosed region within the indoor area, wherein localization of a user device inside the trusted-GPS boundary is performed using GPS position data and a subset of fingerprint data pertaining to the user device, the GPS position data being assigned higher weighting than the subset of the fingerprint data while the localizing is occurring, and wherein the subset of the fingerprint data includes at least one of wireless signal data, inertial data, magnetic data, barometric data and optical data.

10. The server computing system of claim 9 wherein the indoor area comprises one of a shopping mall, an airport, a warehouse, a campus building and an at least partially enclosed building.

11. The server computing system of claim 9 wherein acquisition of the at least a first set of fingerprint data is automatically triggered at the at least one mobile device upon an event occurrence, the event occurrence comprising at least one of redeeming a coupon, scanning a barcode, and using an RFID tag.

12. The server computing system of claim 9 wherein the fingerprint data includes at least two of the wireless signal data, the inertial data, the magnetic data, the barometric data and the optical data that are time-stamped and time-correlated for respective positions locations along the sequence of positions.

13. The server computing system of claim 9 wherein the threshold correlation value comprises a threshold correlation of at least 85%.

14. The server computing system of claim 9 wherein a density determination algorithm establishes the predetermined threshold density as sufficient for deploying as the trusted-GPS positioning map of the indoor area.

15. The server computing system of claim 9 wherein the threshold density of positioning data points is dynamically updated in conjunction with an artificial neural network to validate when a sufficient number of positioning data points have been accumulated for at least a portion of the indoor area.

16. The method of claim 9 wherein the instructions are further executable to define the enclosed region as a trusted-GPS region of the indoor area.

\* \* \* \* \*